United States Patent Office 3,076,741
Patented Feb. 5, 1963

3,076,741
3-SEC.BUTYL-6-CHLOROPHENYL N-METHYLCAR-
BAMATE AND USE THEREOF AS A PESTICIDE
Gustave K. Kohn, Berkeley, Joseph E. Moore, Pinole, and Joseph N. Ospenson, Concord, Calif., assignors to California Research Corporation, San Francisco, Calif., a corporation of Delaware
No Drawing. Filed June 20, 1960, Ser. No. 37,106
2 Claims. (Cl. 167—30)

This invention relates to a new compound; namely, 3-sec.butyl-6-chlorophenyl N-methylcarbamate and its use as a cholinesterase inhibitor in agricultural pesticide formulations.

One of the ultimate criteria relating to the effectiveness of certain agricultural pesticides which function as contact and/or digestive toxicants is their ability to inhibit the cholinesterase enzyme system of the animal parasite. This type of functional activity is primarily responsible for the effectiveness of at least two of the recognized classes of synethetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely, 3-sec.butyl-6-chlorophenyl N-methylcarbamate, whose anticholinesterase activity is markedly superior to some of the most active carbamate esters previously known. In fact, the cholinergic activity of the invention compound is of the order of twenty-five times greater than the activity of its analog; namely, m-t-butylphenyl N-methylcarbamate. This outstanding activity as a cholinesterase inhibitor accentuates its effectiveness as an agricultural pesticide and particularly its application as a contact and/or digestive toxicant for the purpose of inhibiting the cholinesterase function in the cold-blooded animal parasites such as insects, mites, nematodes, arachnids, etc.

The invention compound 3-sec.butyl-6-chlorophenyl N-methylcarbamate, which is definitive of the following structural formula,

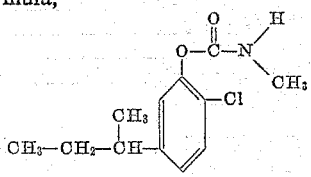

may be prepared (1) by reacting 3-sec.butyl-6-chlorophenol with methylisocyanate or (2) by reacting 3-sec.butyl-6-chlorophenol or the corresponding metal phenate with phosgene followed by reaction of the resulting intermediate chloroformate with methylamine.

Of particular significance to the production of the subject cholinesterase inhibitor is the particularity of the ester component of the carbamate.

While the 3-sec.butyl-6-chlorophenyl radical is considered to be responsible for maximum cholinergic activity, the position of the chloro substituent is not necessarily restricted to the 6-position. Thus, the carbamate ester of the invention may be derived from a phenolic reactant which is obtained by the monochlorination of 3-sec.butylphenol. For all practical purposes, the monochlorination of 3-sec. butylphenol will result in a predominant yield of the 3-sec. butyl-6-chlorophenol. The following examples represent a synthesis approach to the compound of the invention which substantially verifies the indicated and claimed structure of the compound. It will be understood that commercial practice may involve alternate and more abbreviated methods of preparation, as indicated above.

EXAMPLE I

Preparation of 3-Sec.Butyl-6-Chlorophenol 430 pounds of benzene was charged to a 100-gallon vessel and 15 pounds of anhydrous $AlCl_3$ was added slowly. The temperature was increased to 123° F. and 278 pounds of n-butyl chloride was added at this temperature during a three-hour period. The heating and agitation were continued for an additional 1½ hours and the mixture was quenched with 10 gallons of water, washed with additional water, and then distilled. A total of 440 pounds of sec.butyl benzene was collected at 135–147° F. at 15 mm.

440 pounds of the above material was charged to a 100-gallon vessel and five pounds of 98% $H_2SO_4$ was added with agitation. This solution was then heated to 110° F. and 450 pounds of sulfuryl chloride (containing 1% $S_2Cl_2$) was added slowly over a six hour period. The temperature was maintained until no more $SO_2$ or HCl was evolved. This crude product was then washed and distilled. Chloro-sec.butyl benzene was collected at 150–195° F. at 15 mm.

156 pounds of 70% $HNO_3$ was charged to a 100-gallon vessel and 257 pounds of 98% $H_2SO_4$ was added slowly over a period of three hours at a temperature of 80° F. A total of 195 pounds of the above chloro-sec.butyl benzene was then added over a period of seven hours with agitation. When all had been added, 45 pounds of additional 98% $H_2SO_4$ was added and the mixture stirred for twelve hours. The organic phase containing p-sec.butyl nitrochlorobenzene was separated and used directly in the next step.

62 gallons of water and 100 pounds of zinc were charged to a 100-gallon vessel and heated to 180° F. 110 pounds of the above nitro compound were added and then 161 pounds of 98% $H_2SO_4$ were slowly added over five hours. The mixing was continued for several hours and the acid phase was separated and discarded. The organic phase had ten gallons of benzene added and was then washed twice with ten gallons of 20% aqueous caustic. The resultant product was distilled and the desired 3-sec.butyl-6-chloro aniline was obtained at 290–300° F. and 15 mm. of Hg.

The above amine was diazotized by adding 51.5 pounds of the amine and 15 gallons of water to a 100 gallon vessel and slowly adding 85.3 pounds of 98% $H_2SO_4$ at a temperature of less than 125° F. The temperature was then reduced to 30° F. and a solution of 21.5 pounds $NaNO_2$ in 6.6 gallons of water was slowly added over a five-hour period at 30° F. After all had been added, an additional 25 gallons of ice water was added and the solution held at 32° F. while 8.5 gallons of water and 165 pounds of 98% $H_2SO_4$ were charged to a 30-gallon vessel equipped with a steam injector. The temperature of the acid-water mixture was raised to 310° F. and the diazotized amine solution was added slowly (approximately four gallons per hour). The resultant phenol was removed by steam distillation and the desired 3-sec.butyl-6-chlorophenol was phase separated and dried.

EXAMPLE II

Preparation of 3-Sec.Butyl-6-Chlorophenyl N-Methylcarbamate 32 pounds of the phenol from Example I and 10 pounds of methyl isocyanate were mixed and added to a special pressure reactor. 5 ml. of dibutyl-tin-dilaurate (catalyst) was added and the unit sealed. Heat was applied until the temperature rose to 150° F. and the pressure to 26 p.s.i.g. After 48 hours the pressure decreased to approximately 6 p.s.i.g. The unit was opened and put under reduced pressure to remove all traces of isocyanate. The product was removed as a dark brown to black melt which solidified on cooling.

ANALYSIS

| Percent of— | Theory | Found |
|---|---|---|
| Cl | 14.7 | 14.28 |
| N | 5.8 | 6.06 |

After recrystallization from mixed hexanes, the product melted at 65.5–66.5° C.

In the application of the subject compound as a cholinesterase inhibitor, considerable variation in its formulation may be employed. Thus, 3-sec.butyl-6-chlorophenyl N-methylcarbamate may be applied per se or in combination with other active ingredients in both solid or liquid pesticidal formulations. As an example, 3-sec.butyl-6-chlorophenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or nonionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period. The results are reporated as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 mole sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at 25.0°±0.1° C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman model G or equivalent pH meter.

The percent inhibition is then calculated from the pH values obtained for the blank, uninhibited enzyme, and the candidate inhibitor. A curve is then prepared by plotting on a semilogarithmic graph paper the concentration of the inhibitor in gamma/ml. on the log scale versus percent inhibition on the linear scale. The curve will be S shaped. The concentration where the curve crosses the 50 percent inhibition mark is the $I_{50}$ value.

The superior cholinergic activity or cholinesterase inhibition of 3-sec.butyl-6-chlorophenyl N-methylcarbamate is attested by the following results in comparison with its prior art analog, m-t-butylphenyl n-methylcarbamate and its unsubstituted homolog, m-sec.butylphenyl N-methylcarbamate.

| Compound: | $I_{50}$ |
|---|---|
| m-t-Butylphenyl N-methylcarbamate | 0.11 |
| m-Sec.butylphenyl N-methylcarbamate | 0.014 |
| 3-sec.butyl-6-chlorophenyl N-methyl carbamate | 0.004 |

Obviously, many modifications and variations of the invention as hereinbefore set forth may be made without departing from the spirit and scope thereof, and therefore only such limitations should be imposed as are indicated in the appended claims.

We claim:
1. 3-sec.butyl-6-chlorophenyl N-methylcarbamate.
2. A method of inhibiting the cholinesterase function in cold-blooded animal parasites which comprises contacting said parasites with 3-sec.butyl-6-chlorophenyl N-methylcarbamate.

References Cited in the file of this patent

UNITED STATES PATENTS

| 2,208,485 | Aeschlimann | July 16, 1940 |
| 2,362,508 | Stevens et al. | Nov. 14, 1944 |
| 2,677,698 | Deutschmann et al. | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

FOREIGN PATENTS

| 753,766 | Great Britain | Aug. 1, 1956 |

OTHER REFERENCES

Kolbezen et al.: Agricultural and Food Chemistry, 2, 864–70 (1954).

Stroh et al.: Angerwandte Chemie, 69, 702 (1957).